(12) United States Patent
Zhang et al.

(10) Patent No.: US 11,587,574 B2
(45) Date of Patent: Feb. 21, 2023

(54) VOICE PROCESSING METHOD, APPARATUS, ELECTRONIC DEVICE, AND STORAGE MEDIUM

(71) Applicant: Beijing Dajia Internet Information Technology Co., Ltd., Beijing (CN)

(72) Inventors: Chen Zhang, Beijing (CN); Pei Dong, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/404,175

(22) Filed: Aug. 17, 2021

(65) Prior Publication Data
US 2021/0375298 A1 Dec. 2, 2021

Related U.S. Application Data

(63) Continuation of application No. PCT/CN2020/072326, filed on Jan. 15, 2020.

(30) Foreign Application Priority Data

Feb. 22, 2019 (CN) .......................... 201910134351.4

(51) Int. Cl.
G10L 21/0216 (2013.01)
G10L 21/0208 (2013.01)
(Continued)

(52) U.S. Cl.
CPC .......... G10L 21/0216 (2013.01); G10L 19/02 (2013.01); G10L 25/93 (2013.01);
(Continued)

(58) Field of Classification Search
CPC ................... G10L 2021/02082; G10L 21/0216
See application file for complete search history.

(56) References Cited

U.S. PATENT DOCUMENTS 8,374,851 B2 * 2/2013 Unno .................... H04M 9/082
704/208
8,634,569 B2 1/2014 Lu et al.
(Continued)

FOREIGN PATENT DOCUMENTS

CN 102164210 A 8/2011
CN 102447795 A 5/2012
(Continued)

OTHER PUBLICATIONS

International Search Report issued in PCT/CN2020/072326, dated Apr. 7, 2020 (5 pages).

(Continued)

Primary Examiner — Bryan S Blankenagel
(74) Attorney, Agent, or Firm — Meunier Carlin & Curfman LLC

(57) ABSTRACT

Provided in the present disclosure are a voice processing method, an apparatus, an electronic device, and a storage medium, the method comprising: detecting the working state of a current call system, and when the working state is a two-end speaking state or a remote-end speaking state, performing compression processing on a subsequent remote-end voice signal, acquiring a near-end voice signal by means of a microphone, performing echo processing on the basis of the near-end voice signal and the compression-processed remote-end voice signal to obtain an echo-processed near-end voice signal and a remaining echo signal, performing non-linear suppression processing on the near-end voice signal and the remaining echo signal, and performing gain control on the suppression-processed near-end voice signal.

11 Claims, 6 Drawing Sheets

(51) Int. Cl.
   *G10L 19/02*      (2013.01)
   *G10L 25/93*      (2013.01)
(52) U.S. Cl.
   CPC ............... *G10L 2021/02082* (2013.01); *G10L 2021/02163* (2013.01); *G10L 2025/937* (2013.01)

(56) References Cited

U.S. PATENT DOCUMENTS

| | | | |
|---|---|---|---|
| 10,244,121 B2 | 3/2019 | Mani et al. | |
| 10,622,009 B1* | 4/2020 | Zhang | H04B 3/234 |
| 2003/0086382 A1 | 5/2003 | Song et al. | |
| 2005/0129225 A1* | 6/2005 | Piket | H04M 9/082 |
| | | | 379/406.01 |
| 2009/0202063 A1* | 8/2009 | Frauenthal | H04M 9/08 |
| | | | 379/406.16 |
| 2012/0121096 A1* | 5/2012 | Chen | G10L 21/0364 |
| | | | 381/57 |
| 2015/0112672 A1* | 4/2015 | Giacobello | H04M 9/082 |
| | | | 704/233 |
| 2015/0288807 A1* | 10/2015 | Mani | H04M 1/20 |
| | | | 379/406.07 |
| 2016/0127561 A1* | 5/2016 | Mani | H03G 3/32 |
| | | | 379/406.08 |
| 2018/0255183 A1 | 9/2018 | Zhou | |
| 2018/0309871 A1* | 10/2018 | Shi | H04B 3/23 |
| 2019/0165832 A1* | 5/2019 | Khanduri | H04L 5/14 |
| 2020/0274972 A1* | 8/2020 | Weruaga | H04M 9/082 |

FOREIGN PATENT DOCUMENTS

| | | |
|---|---|---|
| CN | 103067628 A | 4/2013 |
| CN | 105577961 A | 5/2016 |
| CN | 106657507 A | 5/2017 |
| CN | 107819964 A | 3/2018 |
| CN | 109862200 A | 6/2019 |
| WO | 2016196212 A1 | 12/2016 |

OTHER PUBLICATIONS

English Translation of Chinese First Office Action issued in CN 201910134351.4, dated Jun. 11, 2020 (6 pages).

Notification to Grant the Patent Right for invention issued in CN 201910134351.4, dated Jan. 19, 2021.

* cited by examiner

VOICE PROCESSING METHOD, APPARATUS, ELECTRONIC DEVICE, AND STORAGE MEDIUM

The disclosure is a continuation application of International Application No. PCT/CN2020/072326, filed on Jan. 15, 2020, which is based on and claims priority to Chinese Patent Application No.

FIELD

The disclosure relates to the field of communication technology, in particular to a method and device for processing a voice, electronic equipment and a storage medium.

BACKGROUND

The echo is generated by the acoustics loop between a loudspeaker and a microphone. That is to say, sound signals coming from the remote-end are sent out through the near-end loudspeaker, collected by the microphone and then transmitted back to the remote-end, at this time, a talker at the remote-end can hear his/her own echo, which severely affects the communication quality.

In order to improve the communication quality, in the related art, a self-adapting filter in an echo cancelation system can be used for simulating the feedback loop formed by echoes to cancel partial echo signals collected by the microphone. The self-adapting filter cannot completely cancel the echoes, especially echo signals after non-linear distortion, so a non-linear processor (NLP) module is further adopted to cancel residual echoes after the echo signals are processed by the self-adapting filter.

Although the NLP can play the role in suppressing the residual echoes, the inventor finds that in the actual application, there also exist the following problems: first, in a double-talk state, the NLP will also obviously weaken a near-end voice signal while suppressing the echoes and second, in a communication system, generally, after acoustic echo cancelation (AEC), automatic gain control (AGC) will also be added to adaptively amplify the near-end voice signal, especially, when the NLP cannot completely suppress the residual echoes, the residual echoes will also be amplified by the AGC, so that the communication quality is affected.

Thus, how to effectively suppress the residual echoes in a double-talk state based on the existing echo cancelation system is a technical problem yet to be solved currently.

SUMMARY

In order to overcome the problems existing in the related art, the disclosure provides a method and device for processing a voice, electronic equipment and a storage medium, so as to solve the problem of poor communication quality caused by the fact that the residual echoes cannot be effectively suppressed in a double-talk state.

According to a first aspect of the embodiment of the present application, a method for processing a voice is provided, including:

detecting a working state of a communication system currently;

attenuating a remote-end voice signal based on the working state being a dual-end talk state or a remote-end talk state, wherein the remote-end voice signal is subsequently received;

obtaining a first near-end voice signal by a microphone;

obtaining a second near-end voice signal and a residual echo signal by performing echo processing on the first near-end voice signal and the attenuated remote-end voice signal, wherein the second near-end voice signal is subjected to echo processing;

performing non-linear suppression processing on the second near-end voice signal and the residual echo signal; and performing gain control on a third near-end voice signal, wherein the third near-end voice signal is subjected to suppression processing.

According to a second aspect of the embodiment of the present application, a device for processing a voice is provided, including:

a detection module, configured to detect the working state of the communication system currently;

an attenuating module, configured to attenuate a remote-end voice signal based on the working state being a dual-end talk state or a remote-end talk state, wherein the remote-end voice signal is subsequently received;

an obtaining module, configured to obtain a first near-end voice signal by a microphone;

an echo processing module, configured to obtain a second near-end voice signal and a residual echo signal by performing echo processing on the first near-end voice signal and the attenuated remote-end voice signal, wherein the second near-end voice signal is subjected to echo processing;

a suppression processing module, configured to perform non-linear suppression processing on the second near-end voice signal and the residual echo signal; and a gain control module, configured to perform gain control on a third near-end voice signal, wherein the third near-end voice signal is subjected to suppression processing.

According to a third aspect of the embodiment of the present application, electronic equipment is provided, including: a processor; and a memory configured to store instructions that are executed by the processor; wherein, the processor is configured to:

detect a working state of a communication system currently;

attenuate a remote-end voice signal based on the working state being a dual-end talk state or a remote-end talk state, wherein the remote-end voice signal is subsequently received;

obtain a first near-end voice signal by a microphone;

obtain a second near-end voice signal and a residual echo signal by performing echo processing on the first near-end voice signal and the attenuated remote-end voice signal, wherein the second near-end voice signal is subjected to echo processing;

perform non-linear suppression processing on the second near-end voice signal and the residual echo signal; and perform gain control on the third near-end voice signal, wherein the third near-end voice signal is subjected to suppression processing.

According to a fourth aspect of the embodiment of the present application, a non-transitory computer readable storage medium is provided, wherein when instructions in the storage medium are executed by a processor of electronic equipment, the electronic equipment is caused to perform any one of the abovementioned methods for processing the voice.

According to a fifth aspect of the embodiment of the present application, a computer program product is provided, wherein when instructions in the computer program product are executed by a processor of electronic equipment, the electronic equipment is caused to perform any one of the abovementioned methods for processing the voice.

The technical solution provided by the embodiment of the disclosure can have the following beneficial effects: according to the method for processing the voice described in the exemplary embodiment. When it is detected currently that the working state of the communication system is the dual-end talk state or the remote-end talk state, the subsequently received remote-end voice signal is attenuated, then the first near-end voice signal is obtained by the microphone, echo processing is performed on the first near-end voice signal and the attenuated remote-end voice signal to obtain the second near-end voice signal and the residual echo signal, then non-linear suppression processing is performed on the residual echo signal, gain control is performed on the third near-end voice signal, and finally a near-end voice signal subjected to gain control is output, That is to say, in the embodiment of the present application, when the working state is the dual-end talk state, the subsequently received remote-end voice signal can be attenuated, so that the playing volume of the remote-end voice signal is lowered, then the volume of echoes collected by the microphone becomes small, the interference of echoes is relieved, the residual echoes are effectively suppressed, and the communication quality is improved.

It should be understood that the general description above and the detail description below are only exemplary and explanatory, and cannot limit the disclosure.

BRIEF DESCRIPTION OF THE DRAWINGS

Accompanying drawings here, which are incorporated in and constitute a part of this description, illustrate embodiments consistent with the embodiment of present application and, together with the description, serve to explain principles of the embodiment of present application.

DETAILED DESCRIPTION OF THE EMBODIMENTS

Here, exemplary embodiments will be described in detail, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the disclosure. Rather, they are only examples of devices and methods consistent with some aspects of the disclosure as detailed in the appended claims.

Figure 1:
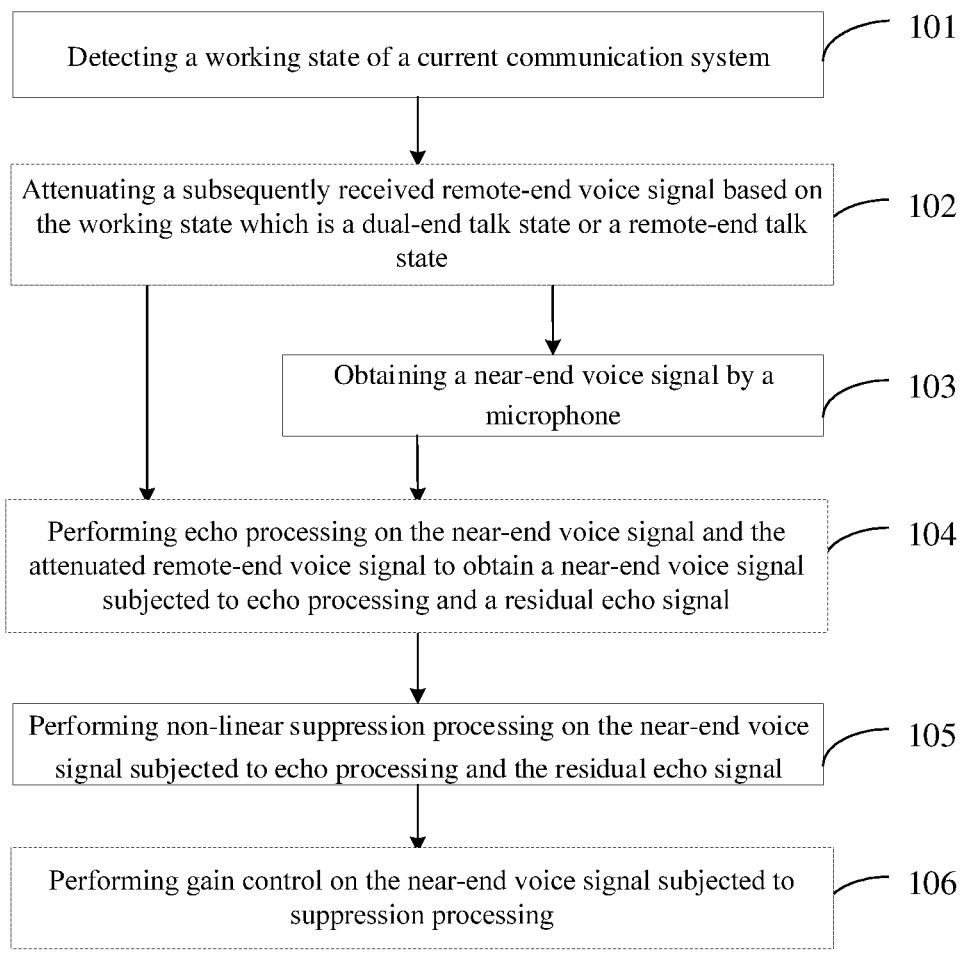
FIG. 1 is a flowchart of a method for processing a voice according to an exemplary embodiment.

FIG. 1 is a flowchart of a method for processing a voice according to an exemplary embodiment. As shown in FIG. 1, the method for processing the voice is applied to a terminal and includes the following steps.

Step 101: a working state of a communication system is detected currently.

This step is to detect whether the working state of the current system is a remote-end talk state, a near-end talk state or a dual-end talk state, and the specific detection manner is detecting whether an acoustic echo cancelation (AEC) module works in a near-end state (only a person at the near end talks), in a remote-end state (only a person at the remote-end talks) or in a dual-end talk state (the person at the near end and the person at the remote-end talk at the same time).

Step 102: a remote-end voice signal is attenuated based on the working state being a dual-end talk state or a remote-end talk state, wherein the remote-end voice signal is subsequently received.

In this embodiment, if it is detected currently that the working state of the communication system is a dual-end talk state or a remote-end talk state at this time, the subsequently received remote-end voice signal can be attenuated according to a first reference attenuation threshold being the default. That is to say, the subsequent remote-end voice signal, value of being larger than the first reference attenuation threshold, is attenuated by adopting the first reference attenuation threshold, so as to lower the playing volume of a received relatively large remote-end voice signal so that the volume of echoes collected by the microphone becomes small, the interference of echoes is relieved, and the communication quality is improved.

Certainly, at this time, when it is detected that the working state of the current system is a dual-end talk state, the first reference attenuation threshold may be lowered to a second reference attenuation threshold; then, the subsequently received remote-end voice signal is attenuated according to the second reference attenuation threshold. That is to say, subsequent remote-end voice signal, the value of being larger than the second reference attenuation threshold, is attenuated by adopting the second reference attenuation threshold, so as to lower the playing volume of a received relatively large remote-end voice signal, so that the volume of echoes collected by the microphone becomes small, the interference of echoes is relieved, and the communication quality is improved.

Step 103: a first near-end voice signal is obtained by a microphone.

Wherein, the first near-end voice signal includes a linear echo signal, being an echo signal of a loudspeaker collected via an acoustic loop besides a voice signal at the near end. That is to say, when the loudspeaker plays a remote-end voice signal, an echo signal will generate at the near end, so that the first near-end voice signal will be interfered.

Step 104: echo processing is performed on the first near-end voice signal and the attenuated remote-end voice signal to obtain a second near-end voice signal, wherein the second near-end voice signal is subjected to echo processing and a residual echo signal.

In this step, after the attenuated remote-end voice signal is received, a linear echo signal can be estimated according to the attenuated remote-end voice signal, and after the first near-end voice signal is obtained, echo processing is performed on the first near-end voice signal based on the estimated linear echo signal so as to remove the linear echo signal from the first near-end voice signal so as to obtain the second near-end voice signal and a residual echo signal.

Step 105: non-linear suppression processing is performed on the second near-end voice signal and the residual echo signal.

In this step, an NLP module is adopted to perform non-linear processing on the second near-end voice signal and the residual echo signal so as to cancel the residual echo signal.

Step 106: gain control is performed on a third near-end voice signal, wherein the third near-end voice signal is subjected to suppression processing.

In this step, for the dual-end talk state, after the first reference attenuation threshold is lowered to the second reference attenuation threshold, the step of performing gain control on the third near-end voice signal processing further includes: performing gain control on the third near-end voice signal based on gain increase change prior to the first reference attenuation threshold is lowered.

For the remote-end talk state, the step of performing gain control on the third near-end voice signal further includes: performing gain control on the third near-end voice signal based on gain change gradually decreasing at a preset rate.

Then, the first near-end voice signal subjected to gain control processing is output.

According to the method for processing the voice described in the exemplary embodiment, when it is detected currently that the working state of the communication system is the dual-end talk state or the remote-end talk state, the subsequently received remote-end voice signal is attenuated, then the first near-end voice signal is obtained by the microphone, echo processing is performed on the first near-end voice signal and the attenuated remote-end voice signal to obtain the second near-end voice signal and the residual echo signal, then non-linear suppression processing is performed on the residual echo signal, gain control is performed on the third near-end voice signal, and finally a near-end voice signal subjected to gain control is output. That is to say, in the embodiment of the present application, when the working state is the dual-end talk state or the remote-end talk state, the subsequently received remote-end voice signal can be attenuated, so that the playing volume of the remote-end voice signal is lowered, then the volume of echoes collected by the microphone becomes small, the interference of the echoes can be relieved, the residual echoes are effectively suppressed, and the communication quality is improved.

Figure 2:
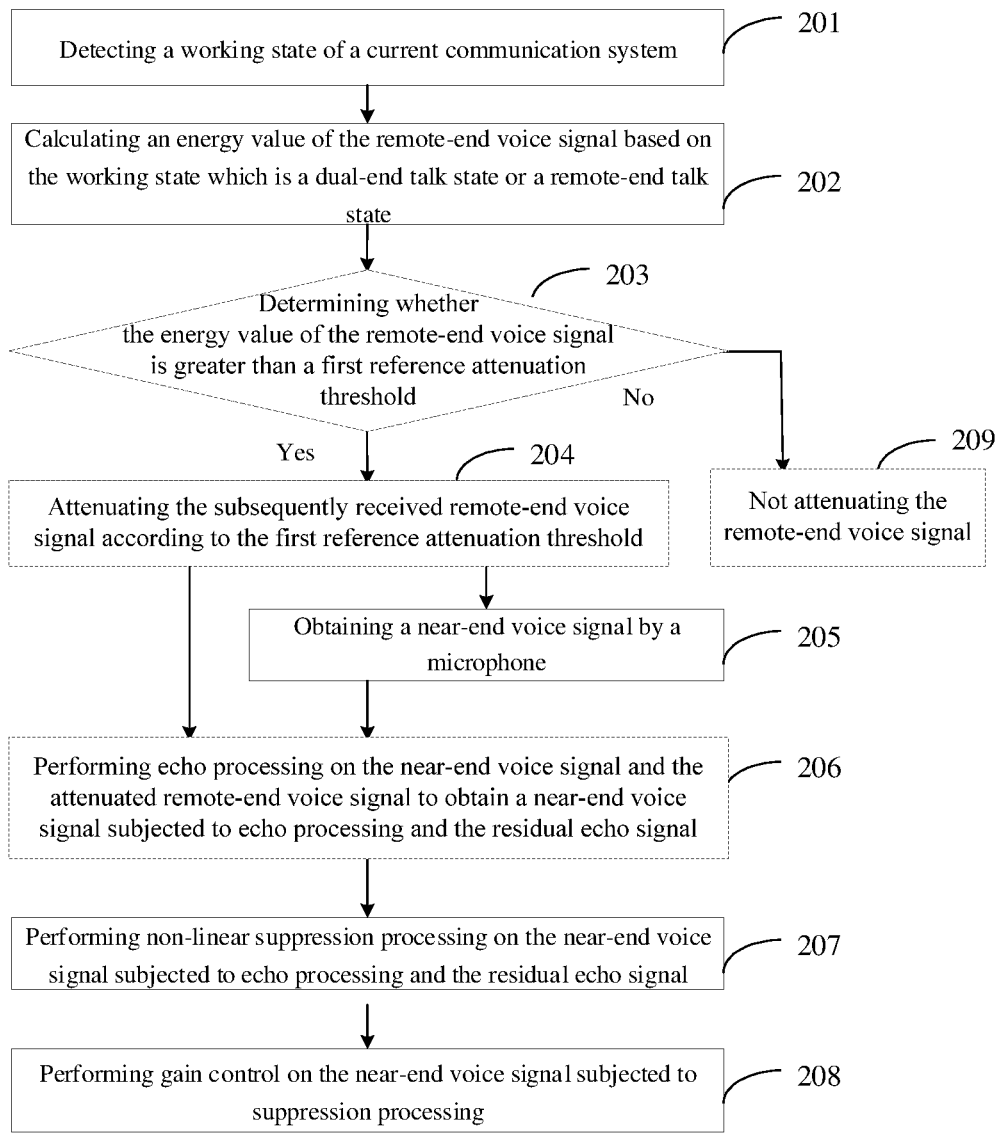
FIG. 2 is another flowchart of a method for processing a voice according to an exemplary embodiment.

Referring to FIG. 2, being another flowchart of a method for processing a voice according to an exemplary embodiment. The embodiment takes the working state being a dual-end talk state as an example and includes the following steps.

Step 201: the working state of the communication system is detected currently.

Wherein, this step is similar to the step 101, and the details may refer to the above and will not be repeated herein.

Step 202: the energy value of the remote-end voice signal is calculated based on the working state being the dual-end talk state or the remote-end talk stale.

In this step, the method of calculating the energy value of the remote-end voice signal includes:

first, extracting multiple samples of the remote-end voice signal, and then calculating the energy value (inputlevel) of the remote-end voice signal based on the multiple samples, wherein the calculation formula is as follows:

$$inputlevel=10*\log 10(sampleData[i]*sampleData[i]);$$

wherein, i represents the time sequence number of the samples.

Step 203: whether the enemy value of the remote-end voice signal is greater than the first reference attenuation threshold is determined, the step 204 is executed when the energy value of the remote-end voice signal is greater than the first reference attenuation threshold, and the step 209 is executed when the energy value of the remote-end voice signal is not greater than the first reference attenuation threshold.

Wherein, the first reference attenuation threshold is a default reference attenuation threshold and is predetermined by technicians at a matter of experience.

In this step, the input energy value (inputlevel) of the remote-end voice signal is compared with the first reference attenuation threshold (threshold) to obtain the comparison result, i.e. the target energy value (outputlevel).

When inputlevel is greater than the threshold, outputlevel inputlevel, that is to say, when the energy value is lower than the first reference attenuation threshold, there is no need to attenuate the received remote-end voice signal, and the received remote-end voice signal of one path can be directly input to an echo cancelation module for estimation of the linear echo signal, and the received remote-end voice signal of the other path can be directly played by the loudspeaker.

When inputlevel is not greater than the threshold, outputlevel=threshold, that is to say, when the input energy value of the remote-end voice signal is higher than the first reference attenuation threshold, the received remote-end voice signal needs to be attenuated, that is, the input energy value of the remote-end voice signal is attenuated to the first reference attenuation threshold.

However, in the actual application, the output target energy value is not equal to the input energy value, energy error will be generated, and the relationship between the output target energy value and the input energy value is represented by the following formula:

$$outputlevel=threshold+(inputlevel-threshold)/ratio;$$

wherein, ratio is a number greater than 1 and indicates the linear interpolation proportion of the output energy value obtained by inputlevel and threshold. In theory, ratio can be equal to 1, at this time, outputlevel=threshold, but in the actual processing, ratio is approximately 1, but can not be equal to 1.

Wherein, the threshold in the embodiment of the present application is a threshold used for controlling whether the received remote-end voice signal needs to be attenuated, and the size of the threshold can be adjusted according to the detection probability of the dual-end talk state.

Certainly, in another aspect, when the working state is a dual-end talk state, the specific adjustment process is as below.

The detection probability of the dual-end talk state is calculated first, then whether the detection probability of the dual-end talk state is greater than a set probability threshold is determined, and when the detection probability is greater than or equal to the set probability threshold, the step of lowering the first reference attenuation threshold to the second reference attenuation threshold is executed, namely the first reference attenuation threshold is lowered by one grade, i.e. the first reference attenuation threshold is adjusted to the second reference attenuation threshold; when the detection probability is smaller than the set probability threshold, no processing is performed, and the original first reference attenuation threshold is maintained, that is to say, the first reference attenuation threshold is continuously used for attenuating the subsequently received remote-end voice signal.

That is to say, in the embodiment of the present application, the reference attenuation threshold (threshold) can be adjusted according to the detection probability of the dual-end talk state, specifically, adjustment can be carried out according to the following formula:

threshold=threshold0−DT_prob*10;

wherein, threshold0 is a reference attenuation threshold in a general state, and DT_prob is the detection probability of the dual-end talk state and between 0 and 1.

It can be seen from the above formula that when the detection probability of the dual-end talk state is relatively large, the reference attenuation threshold needs to be lowered, so that the received remote-end voice signal can be further attenuated.

S204: the subsequently received remote-end voice signal is attenuated according to the first reference attenuation threshold.

In this step, the first reference attenuation threshold being the default is used to attenuate the remote-end voice signal. Prior to the remote-end voice signal is attenuated, a gain adjustment value (inputGain) is calculated by the value of difference between the target energy value and the input energy value of the remote-end voice signal, and the calculation formula is as follows:

inputGain=outputlevel−inputlevel;

then, the gain adjustment value is processed according to the following formula to obtain a smooth gain adjustment value (outputGain):

outputGain=$a1$*outputGain+(1−$a1$)*inputgain;

wherein, 0<$a1$<1.

It should be noted that the calculation in the above process is performed after the remote-end voice signal is transformed to the time domain, and the gain adjustment value of the remote-end voice signal is also required to be transformed to the signal domain for attenuating after the smooth gain adjustment value is obtained, specifically, the gain adjustment value on the time domain can be transformed to the gain adjustment value gain on the signal domain by the following formula:

gain=pow(10,outputGain/20).

Finally, the multiple samples of the remote-end voice signal are attenuated according to the following formula:

sampleData[$i$]=sampleData[$i$]*gain.

Step 205: a first near-end voice signal is obtained by a microphone.

Step 206: echo processing is performed on the first near-end voice signal and the attenuated remote-end voice signal to obtain a second near-end voice signal and a residual echo signal, wherein the second near-end voice signal is subjected to echo processing.

Step 207: non-linear suppression processing is performed on the second near-end voice signal and the residual echo signal.

In this embodiment, steps 205 to 207 are the same as steps 103 to 105. For details, please refer to the above and will not be repeated here.

Step 208: gain control is performed on a third near-end voice signal, wherein the third near-end voice signal is subjected to suppression processing.

In this step, when the working state is the dual-end talk state, that is to say, when a person at the near end and a person at the remote-end talk at the same time, the automatic gain control module will freeze the increase change of gain, namely maintaining the original gain unchanged until the dual-end talk state is exited, the goal of processing in this way is to avoid amplifying the residual echoes so as to improve the echo suppression effect in the actual communication. That is to say, if the previous gain value is N, when it is detected that the communication system enters the dual-end talk state, N is kept unchanged until the communication system exits from the double-talk state.

In addition, after the first reference attenuation threshold is lowered to the second reference attenuation threshold, gain control is performed on the third near-end voice signal based on the gain increase change prior to the first reference attenuation threshold is lowered.

When the working state is a remote-end talk state, namely, only the person at the remote-end talks, gain can be gradually decreased, namely gain control is performed on the third near-end voice signal based on gain change gradually decreasing at a preset ratio.

That is to say, assume that the previous value is N, if N is greater than 1 and it is detected that only the person at the remote-end talks, N will gradually approach 1 at a certain rate, and if N is smaller than 1, the gain value is unchanged.

When the working state is the near-end state, namely, only the person at the near end talks, AGC works normally.

Step 209: the remote-end voice signal is not attenuated.

This processing process is an existing process for processing the voice, and will not be repeated here.

According to the method for processing the voice described in the exemplary embodiment, when it is detected currently that the working state of the communication system is a dual-end talk state, the energy value of the remote-end voice signal is calculated, and the subsequently received remote-end voice signal is attenuated (further, the subsequent remote-end voice signal can be attenuated after the reference attenuation threshold is lowered, and the like) when it is determined that the energy value of the remote-end voice signal is greater than the reference attenuation threshold, then the first near-end voice signal is obtained by the microphone, echo processing is performed on the first near-end voice signal and the attenuated remote-end voice signal to obtain the second near-end voice signal and a residual echo signal, then non-linear suppression processing is performed on the residual echo signal and the second near-end voice signal, gain control is performed on the third near-end voice signal (gain control can be performed on the third near-end voice signal by keeping the gain value unchanged, or after the reference attenuation threshold is lowered, gain control is performed on the third near-end voice signal based on the gain increase change prior to the reference attenuation threshold is lowered), and finally a near-end voice signal subjected to gain control is output. That is to say, in the embodiment of the present application, when the working state is the dual-end talk state and the energy value of the remote-end voice signal is greater than the reference attenuation threshold, the subsequently received remote-end voice signal can be attenuated according to the reference attenuation threshold, or after the reference attenuation threshold is lowered, gain control is performed on the third near-end voice signal based on the gain increase change prior to the reference attenuation threshold is lowered, so that the playing volume of the remote-end voice signal is lowered, then the volume of echoes collected by the microphone becomes small, the interference of the echoes is relieved, the residual echoes are effectively suppressed, and the communication quality is improved.

Optionally, in another embodiment, on the basis of the above embodiment, prior to the subsequently received remote-end voice signal is attenuated, the embodiment may also include:

performing equalization filtering processing on a low-frequency signal in the subsequently received remote-end voice signal;

the step of attenuating the subsequently received remote-end voice signal further includes:

attenuating the remote-end voice signal subjected to equalization filtering processing.

That is to say, in this embodiment, an equalizer may be added to the playing end for performing equalization filtering on the low-frequency signal (generally, this part of low-frequency signal cannot be played) in the subsequently received remote-end voice signal, specifically, an iir filter with preset parameters can be adopted to perform filtering and attenuate unnecessary frequency components according to the characteristics of the loudspeaker in a feedback loop to avoid generation of non-linear distortion.

It should be noted that for the method embodiments, for the sake of simple description, they are all expressed as a series of action combinations, but those skilled in the art should know that the embodiments of the present application are not limited by the described sequence of actions, because according to the embodiments of the present application, certain steps may be performed in another order or simultaneously. Secondly, those skilled in the art should also be aware that the embodiments described in the description are all preferred embodiments, and the actions involved are not necessarily required by the embodiments of this application.

Figure 3:
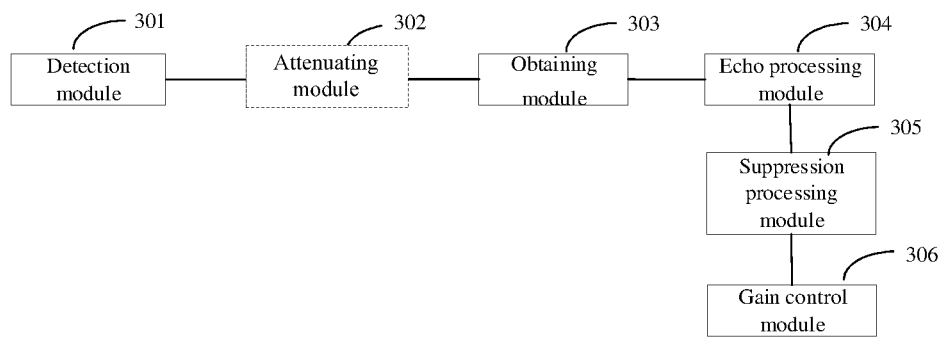
FIG. 3 is a structural schematic diagram of a device for processing a voice according to an exemplary embodiment.

FIG. 3 is a structural schematic diagram of a device for processing the voice according to an exemplary embodiment. Referring to FIG. 3, the device includes: a detection module 301, a attenuating module 302, an obtaining module 303, an echo processing module 304, a suppression processing module 305 and a gain control module 306.

The detection module 301 is configured to detect the working state of the communication system currently;

the attenuating module 302 is configured to attenuate a remote-end voice signal when the detection module detects that the working state is a dual-end talk state or a remote-end talk state, wherein the remote-end voice signal is subsequently received;

the obtaining module 303 is configured to obtain a first near-end voice signal by a microphone;

the echo processing module 304 is configured to obtain a second near-end voice signal and a residual echo signal by performing echo processing on the first near-end voice signal and the attenuated remote-end voice signal, wherein the second near-end voice signal is subjected to echo processing;

the suppression processing module 305 is configured to perform non-linear suppression processing on the second near-end voice signal and the residual echo signal; and the gain control module 306 is configured to perform gain control on a third near-end voice signal, wherein the third near-end voice signal is subjected to suppression processing.

Optionally, in another embodiment, this embodiment is based on the above-mentioned embodiment, the attenuating module includes: a first attenuating module; and/or, an adjusting module and a second attenuating module (not shown in the figure), wherein, the first attenuating module is configured to attenuate the remote-end voice signal based on a first reference attenuation threshold when the detection module detects that the working state is the dual-end talk state or the remote-end talk state, wherein the first reference attenuation threshold is a default;

the adjusting module is configured to lower the first reference attenuation threshold to a second reference attenuation threshold when the detection module detects that the working state is the dual-end talk state; and the first attenuating module is configured to attenuate the subsequently received remote-end voice signal based on the second reference attenuation threshold.

Figure 4:
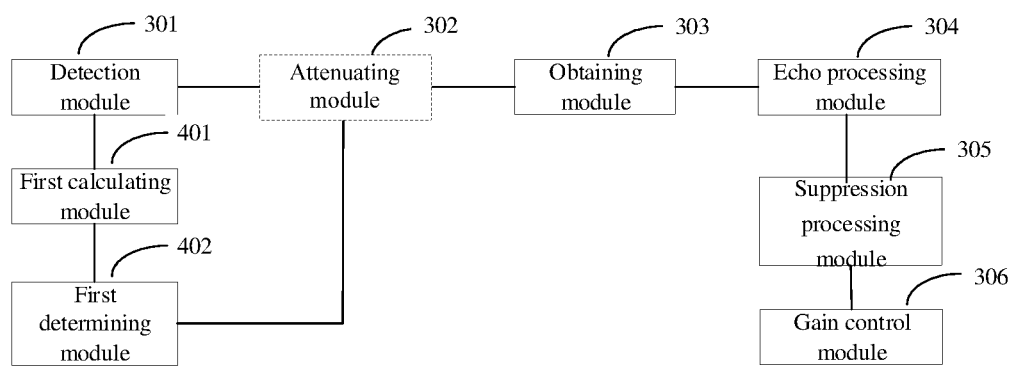
FIG. 4 is another structural schematic diagram of a device for processing a voice according to an exemplary embodiment.

Optionally, in another embodiment, this embodiment is based on the above-mentioned embodiment, the device may further include: a first calculating module 401 and a first determining module 402, and the structural schematic diagram of the device is as shown in FIG. 4, wherein, the first calculating module 401 is configured to calculate an energy value of the remote-end voice signal prior to the first attenuating module 302 attenuates the subsequently received remote-end voice signal;

the first determining module 402 is configured to determine whether the energy value is greater than the first reference attenuation threshold;

the first attenuating module 302 is further configured to attenuate the subsequently received remote-end voice signal based on the first reference attenuation threshold when first determining module 402 determines that the energy value is greater than the first reference attenuation threshold.

Optionally, in another embodiment, this embodiment is based on the above-mentioned embodiment, the device may further include: a second calculating module and an adjusting module (not shown in the figure), wherein, the second calculating module is configured to calculate a detection probability of the dual-end talk stale when the detection module detects that the working state is a dual-end talk state;

the second determining module is configured to determine whether the detection probability is greater than a set probability threshold;

the adjusting module is further configured to lower the first reference attenuation threshold to the second reference attenuation threshold when the second determining module determines that the detection probability is greater than or equal to the set probability threshold.

Optionally, in another embodiment, this embodiment is based on the above-mentioned embodiment, the gain control module is further configured to perform gain control on the third near-end voice signal based on gain increase change prior to the first reference attenuation threshold is lowered after the first reference attenuation threshold is lowered to the second reference attenuation threshold.

Optionally, in another embodiment, this embodiment is based on the above-mentioned embodiment, the gain control module is further configured to perform gain control on the third near-end voice signal based on gain change gradually decreasing at a preset rate when the working state detected by the detection module is the remote-end talk state.

Optionally, in another embodiment, this embodiment is based on the above-mentioned embodiment, the device may further include: an equalization filtering module, wherein, the equalization filtering module is configured to perform equalization filtering processing on a low-frequency signal in the subsequently received remote-end voice signal prior to the attenuating module attenuates the subsequently received remote-end voice signal;

the attenuating module is further configured to attenuate the remote-end voice signal subjected to equalization filtering processing.

Regarding the device in the foregoing embodiment, the specific manner in which each module performs the operation has been described in detail in the embodiment of the method, and will not be elaborated here.

Figure 5:
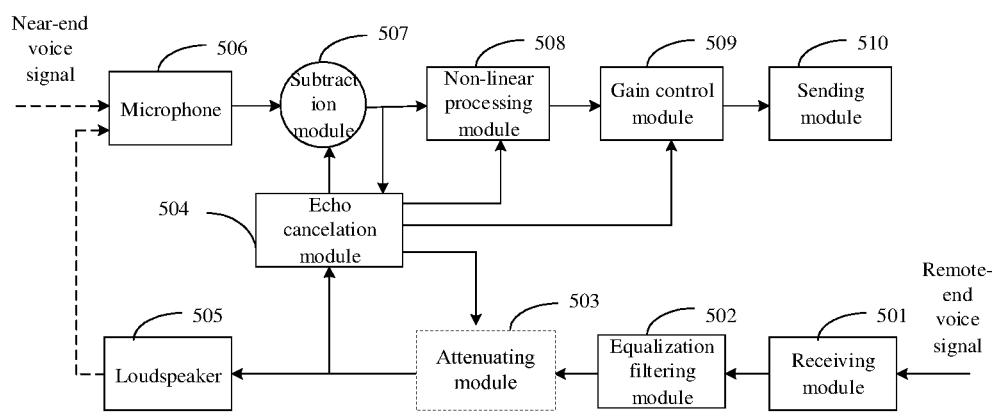
FIG. 5 is a structural schematic diagram of a system for processing a voice according to an exemplary embodiment.

In order to facilitate understanding, referring to FIG. 5 being a structural schematic diagram of a system for processing the voice according to an exemplary embodiment, as shown in FIG. 5, the system for processing the voice includes a receiving module (Receive) 501, an equalization filtering EQ module 502, a attenuating module (attenuator) 503, an echo cancelation (AEC) module 504, a loudspeaker 505, a microphone 506, a subtraction (subtract) module 507, a non-linear processor (NLP) module 508, an automatic gain control (AGC) module 509 and a sending module (Send) 510, wherein, the receiving module 501 receives the remote-end voice signal and sends the remote-end voice signal to the EQ module 502, the EQ module 502 filters out unwanted low-frequency signals in the remote-end voice signal and then sends the filtered remote-end voice signal to the attenuator 503, the attenuator 503 attenuates the received remote-end voice signal, the specific attenuating process can refer to the description of the above corresponding part, and will not be repeated herein, then, the attenuated remote-end voice signal is divided into two paths, remote-end voice signal of one path is played by the loudspeaker 505, remote-end voice signal of the other path is sent to the AEC module 504, and the AEC module 504 estimates a linear echo signal based on the received remote-end voice signal and inputs the linear echo signal to the subtract module 507.

In the meantime, when the remote-end voice signal is played by the loudspeaker 505, the first near-end voice signal is collected by the microphone 506 all the time and an echo signal (including the linear echo signal and the non-linear echo signal) generated by the loudspeaker 505 is also collected by the microphone 506, namely the first near-end voice signal and the echo signal can be collected by the microphone 506, then, the collected near-end voice signal and echo signal are input to the subtract module 507, and the subtract module 507 subtracts the echo signal in the received near-end voice signal and echo signal based on the received linear echo signal output by the AEC module 504, namely, subtracting the linear echo signal output by the AEC module 504 from the received near-end voice signal and echo signal to obtain a near-end voice signal and residual non-linear echo signal.

Afterwards, the obtained near-end voice signal and residual non-linear echo signal is divided into two paths, signal of one path is transmitted to the AEC module 504, and signal of the other path is sent to the NLP module 508. After receiving signals of the two paths (i.e., the near-end voice signal and the remote-end voice signal), the AEC module 504 can detect the working state (which can be the near-end talk state, the remote-end talk state or the dual-end talk state) of the communication system at this time in sequence, if the working state is the dual-end talk state, the AEC module 504 sends a attenuating signal to the attenuator module 503, the attenuator module 503 can attenuate the subsequently received remote-end voice signal based on the default reference attenuation threshold, of course, further, when the detection probability of the dual-end talk state is greater than a probability threshold, the reference attenuation threshold is lowered by one grade (i.e., lowering the reference attenuation threshold by one preset value), and the subsequently received remote-end voice signal is attenuated according to the lowered reference attenuation threshold.

Meanwhile, the AEC module 504 sends a gain control unchanged signal to the AGC module 509, and the AGC module 509 controls the current gain to be unchanged according to the received gain control unchanged signal.

Then the AEC module 504 sends a linear echo signal needing to be subtracted next time to the subtract module 507, and then the AEC module 504 sends a reference value to the NLP module 508 for informing the NLP module 508 of the over-subtraction amount. At this time, signal of the other path output by the subtract module 507 is subjected to over-subtraction processing in the NLP module 508, namely the non-linear echo signal is subjected to non-linear processing, afterwards, the near-end voice signal subjected to non-linear processing is sent to the AGC module 509 for gain control processing, and then the sending module 510 sends the near-end voice signal subjected to gain control processing.

In the embodiment of the present application, in the dual-end talk state or the remote-end talk state, the received remote-end voice signal is attenuated to lower the playing volume of the relatively large remote-end voice signal, thereby making the volume of echoes collected by the microphone become smaller, which reduces the interference of the echo, and suppression processing is performed on the non-linear echo signal, and gain control is performed on the near-end voice signal subjected to suppression processing, so that the residual echoes are effectively suppressed, namely, the problem that the echo cancelation system cannot effectively suppress the residual echoes in the dual-end talk state is solved, and the communication quality is improved.

Figure 6:
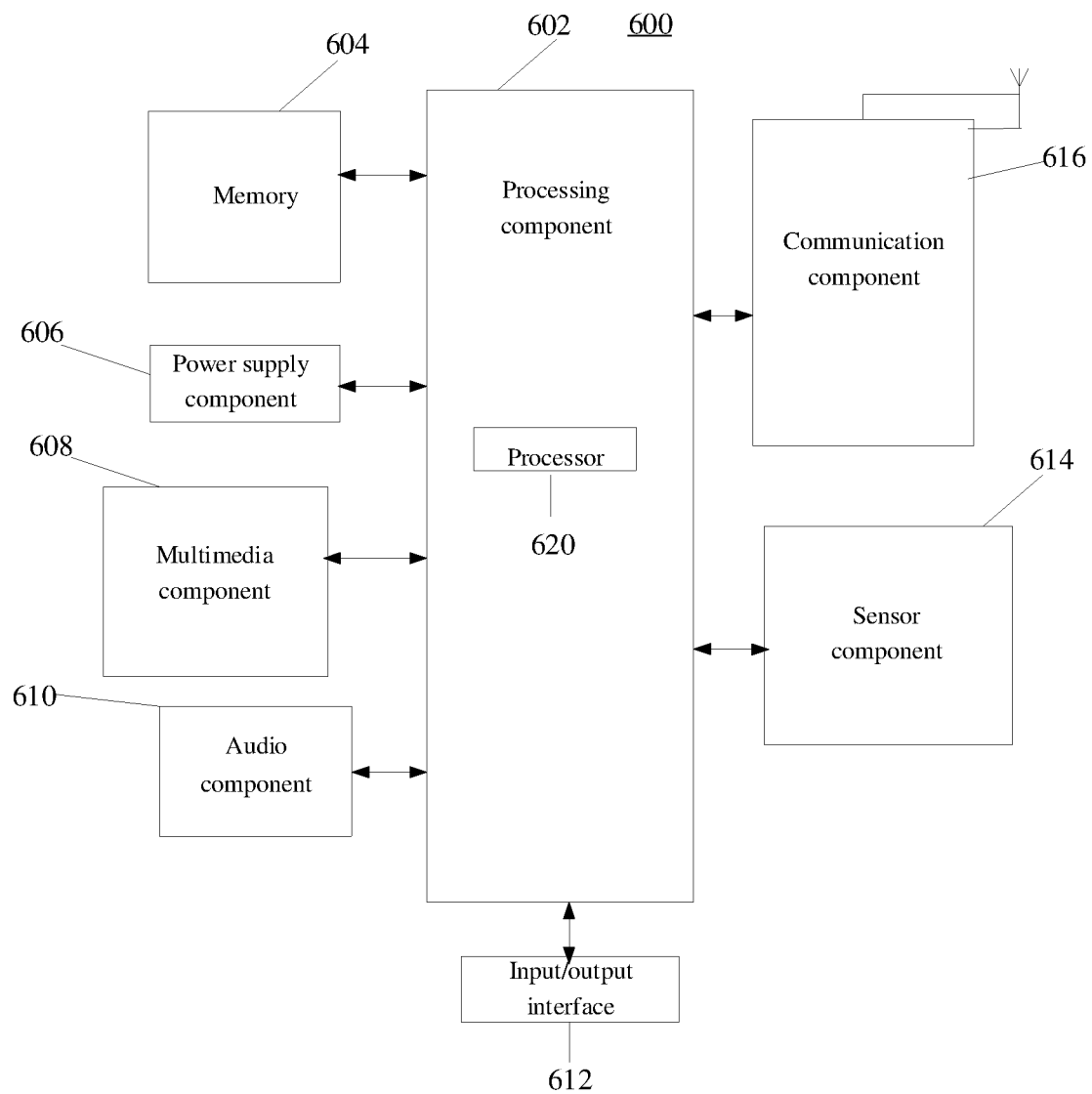
FIG. 6 is a structural block diagram of electronic equipment according to an exemplary embodiment.

FIG. 6 is a block diagram of electronic equipment 600 according to an exemplary embodiment. The electronic equipment may be a mobile terminal or a server. The embodiment of the present application takes the electronic equipment being a mobile terminal as an example for description. For example, the electronic equipment 600 may be a mobile phone, a computer, a digital broadcasting terminal, messaging equipment, a game console, a tablet equipment, medical equipment, fitness equipment, a personal digital assistant, etc.

Referring to FIG. 6, the electronic equipment 600 may include one or more of the following components: a processing component 602, a memory 604, a power supply component 606, a multimedia component 608, an audio component 610, an input/output WO) interface 612, a sensor component 614 and a communication component 616.

The processing component 602 generally controls the overall operations of the electronic equipment 600, such as operations associated with display, telephone call, data communication, camera operation and recording operation. The processing component 602 may include one or more processors 620 to execute instructions to complete all or part of the steps of the foregoing method. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support operations at the electronic equipment 600. Examples of these data include instructions for any application or method operating on the electronic equipment 600, contact data, phone book data, messages, pictures, videos, etc. The memory 604 can be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 606 provides power for various components of the electronic equipment 600. The power supply component 606 may include a power management system, one or more power supplies, and other components associated with the generation, management, and distribution of power for the electronic equipment 600.

The multimedia component 608 includes a screen that provides an output interface between the electronic equipment 600 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of a touch or sliding action, but also detect the duration and pressure related to the touch or sliding operation. In some embodiments, the multimedia component 608 includes a front-facing camera and/or a rear-facing camera. When the electronic equipment 600 is in an operation mode, such as a shooting mode or a video mode, the front-facing camera and/or the rear-facing camera can receive external multimedia data. Each of the front-facing camera and the rear-facing camera may be a fixed optical lens system or has focal length and optical zoom capabilities.

The audio component 610 is configured to output and/or input audio signals. For example, the audio component 610 includes a microphone (MIC), and when the electronic equipment 600 is in an operation mode, such as a call mode, a recording mode or a voice recognition mode, the microphone is configured to receive an external audio signal. The received audio signal can be further stored in the memory 604 or sent via the communication component 616, in some embodiments, the audio component 610 further includes a loudspeaker for outputting audio signals.

The I/O interface 612 provides an interface between the processing component 602 and a peripheral interface module. The above-mentioned peripheral interface module may be a keyboard, a click wheel, a button, or the like. These buttons may include but are not limited to: a home button, a volume button, a start button and a locking button.

The sensor component 614 includes one or more sensors for providing the electronic equipment 600 with various aspects of state evaluation. For example, the sensor component 614 can detect the on/off state of the electronic equipment 600 and the relative positioning of the components. For example, the components are the display and the keypad of the electronic equipment 600. The sensor component 614 can also detect the electronic equipment 600 or the position change of one component of the electronic equipment 600, the presence or absence of contact between the user and the electronic equipment 600, the orientation or acceleration/deceleration of the electronic equipment 600, and the temperature change of the electronic equipment 600. The sensor component 614 may include a proximity sensor configured to detect the presence of nearby objects when there is no physical contact. The sensor component 614 may also include a light sensor, such as a CMOS or CCD image sensor, for use in imaging applications. In some embodiments, the sensor component 614 may also include an acceleration sensor, a gyroscope sensor, a magnetic sensor, a pressure sensor or a temperature sensor.

The communication component 616 is configured to facilitate wired or wireless communication between the electronic equipment 600 and other equipment. The electronic equipment 600 can access a wireless network based on a communication reference, such as WiFi, an operator network (such as 2G, 3G, 4G, or 5G), or a combination thereof. In an exemplary embodiment, the communication component 616 receives a broadcast signal or broadcast related information from an external broadcast management system via a broadcast channel. In an exemplary embodiment, the communication component 616 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the electronic equipment 600 can be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components to perform the methods for processing the voice shown in the above-mentioned FIGS. 1 and 2.

In an exemplary embodiment, a non-transitory computer-readable storage medium including instructions is also provided, such as the memory 604 including instructions which can be executed by the processor 620 of the electronic equipment 600 to complete the methods for processing the voice shown in the above-mentioned FIGS. 1 and 2. For example, the non-transitory computer-readable storage medium may be an ROM, a random access memory (RAM), a CD-ROM, a magnetic tape, a floppy disk, an optical data storage device, etc.

In an exemplary embodiment, a computer program product is also provided. When instructions in the computer program product are executed by the processor 620 of the electronic equipment 600, the electronic equipment 600 is caused to execute the methods for processing the voice shown in the above-mentioned FIGS. 1 and 2.

Figure 7:
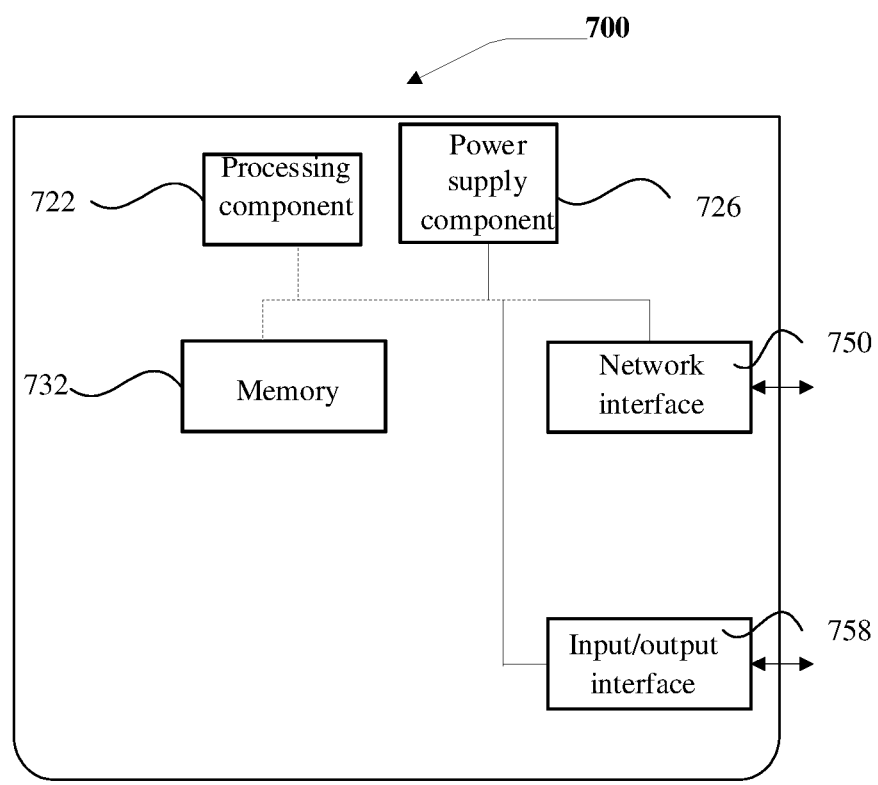
FIG. 7 is another structural block diagram of electronic equipment according to an exemplary embodiment.

FIG. 7 is a block diagram of electronic equipment 700 for processing the voice according to an exemplary embodiment. For example, the electronic equipment 700 may be provided as a server. Referring to FIG. 7, the electronic equipment 700 includes a processing component 722, which further includes one or more processors, and a memory resource represented by a memory 732 for storing instructions that can be executed by the processing component 722, such as an application program. The application program stored in the memory 732 may include one or more modules each corresponding to a set of instructions. In addition, the processing component 722 is configured to execute instructions to perform the methods for processing the voice shown in the above-mentioned FIGS. 1 and 2.

The electronic equipment 700 may also include a power supply component 726 configured to perform power management of the electronic equipment 700, a wired or wireless network interface 750 configured to connect the electronic equipment 700 to a network, and an input/output (I/O) interface 758. The electronic equipment 700 can operate operating systems, such as Windows Server™, Mac OS X™, Unix™, Linux™ or FreeBSD™, stored in the memory 732.

After considering the description and practicing the content disclosed herein, those skilled in the art will easily think of other implementation solutions of the embodiments of the present application. This application is intended to cover any variations, uses, or adaptive changes of the embodiments of the application. These variations, uses, or adaptive changes follow the general principles of the embodiments of the application and include common knowledge in the technical field that is not disclosed in this disclosure, or conventional technical means. The description and embodiments are only regarded as exemplary, and the true scope and spirit of the embodiments of the present application are pointed out by the following claims.

It should be understood that the embodiments of the present application are not limited to the precise structure described above and shown in the drawings, and various modifications and changes can be made without departing from the scope of the embodiments. The scope of the embodiments of this application is only limited by the appended claims.

What is claimed is:

1. A method for processing a voice, comprising:
   detecting a working state of a communication system currently;
   calculating a detection probability of a dual-end talk state;
   determining a second reference attenuation threshold based on a first reference attenuation threshold and the detection probability, wherein the first reference attenuation threshold is a default;
   attenuation a remote-end voice signal by the second reference attenuation threshold based on the working state being a dual-end talk state or a remote-end talk state, wherein the remote-end voice signal is subsequently received, and the subsequent remote-end voice signal, whose value is larger than the second reference attenuation threshold, is attenuated by adopting the second reference attenuation threshold;
   obtaining a first near-end voice signal by a microphone;
   obtaining a second near-end voice signal and a residual echo signal by performing echo processing on the first near-end voice signal and the attenuated remote-end voice signal, wherein the second near-end voice signal is subjected to echo processing;
   performing non-linear suppression processing on the second near-end voice signal and the residual echo signal; and
   performing gain control on a third near-end voice signal, wherein the third near-end voice signal is subjected to suppression processing, and a gain value of the gain control is different from the first reference attenuation threshold and the second reference attenuation threshold.

2. The method for processing the voice according to claim 1, wherein prior to attenuating the remote-end voice signal, the method further comprises:
   calculating an energy value of the remote-end voice signal; and
   determining whether the energy value is greater than the first reference attenuation threshold; and
   attenuating the remote-end voice signal based on the first reference attenuation threshold when the energy value is greater than the first reference attenuation threshold.

3. The method for processing the voice according to claim 1, wherein when the working state is the remote-end talk state, said performing gain control on the third near-end voice signal comprises:
   in response to original gain value being larger than 1, gradually decreasing the original gain value to approach 1 at a certain rate;
   in response to the original gain value being smaller than 1, maintaining the original gain value not changed.

4. The method for processing the voice according to claim 1, further comprising:
   performing equalization filtering processing on a low-frequency signal in the remote-end voice signal, prior to attenuating the remote-end voice signal;
   said attenuating the remote-end voice signal comprises:
   attenuating the remote-end voice signal subjected to equalization filtering processing.

5. Electronic equipment, comprising:
   a processor; and
   a memory configured to store instructions that are executed by the processor;
   wherein the processor is configured to:
   detect a working state of a communication system currently;
   calculate a detection probability of a dual-end talk state;
   determine a second reference attenuation threshold based on a first reference attenuation threshold and the detection probability, wherein the first reference attenuation threshold is a default;
   attenuate a remote-end voice signal by the second reference attenuation threshold based on the working state being a dual-end talk state or a remote-end talk state, wherein the remote-end voice signal is subsequently received, and the subsequent remote-end voice signal, whose value is larger than the second reference attenuation threshold, is attenuated by adopting the second reference attenuation threshold;
   obtain a first near-end voice signal by a microphone;
   obtain a second near-end voice signal and a residual echo signal by performing echo processing on the first near-end voice signal and the attenuated remote-end voice signal, wherein the second near-end voice signal is subjected to echo processing;
   perform non-linear suppression processing on the second near-end voice signal and the residual echo signal; and
   perform gain control on a third near-end voice signal, wherein the third near-end voice signal is subjected to suppression processing, and a gain value of the gain control is different from the first reference attenuation threshold and the second reference attenuation threshold.

6. The electronic equipment according to claim 5, wherein the processor is further configured to:
   calculate an energy value of the remote-end voice signal; and
   determine whether the energy value is greater than the first reference attenuation threshold; and
   attenuate the remote-end voice signal based on the first reference attenuation threshold when the energy value is greater than the first reference attenuation threshold.

7. The electronic equipment according to claim 5, wherein when the working state is the remote-end talk state, the processor is further configured to:
   in response to original gain value being larger than 1, gradually decrease the original gain value to approach 1 at a certain rate;
   in response to the original gain value being smaller than 1, maintain the original gain value not changed.

8. The electronic equipment according to claim 5, wherein the processor is further configured to:
   perform equalization filtering processing on a low-frequency signal in the remote-end voice signal, prior to attenuating the remote-end voice signal;
   attenuate the remote-end voice signal subjected to equalization filtering processing.

9. A non-transitory computer readable storage medium, wherein when instructions in the storage medium are executed by a processor of electronic equipment, the electronic equipment is caused to perform the method for processing the voice according to claim 1.

10. The method for processing the voice according to claim 1, wherein when the working state is the dual-end talk state, said performing gain control on the third near-end voice signal comprises:
   maintaining original gain value unchanged until the dual-end talk state is exited.

11. The electronic equipment according to claim 5, wherein the processor is further configured to:
   maintain original gain value unchanged until the dual-end talk state is exited.

\* \* \* \* \*